Nov. 3, 1959 J. T. SIMMONS 2,910,864
HYDRAULIC VALVE-LIFTER TESTING DEVICE
Filed Dec. 17, 1956
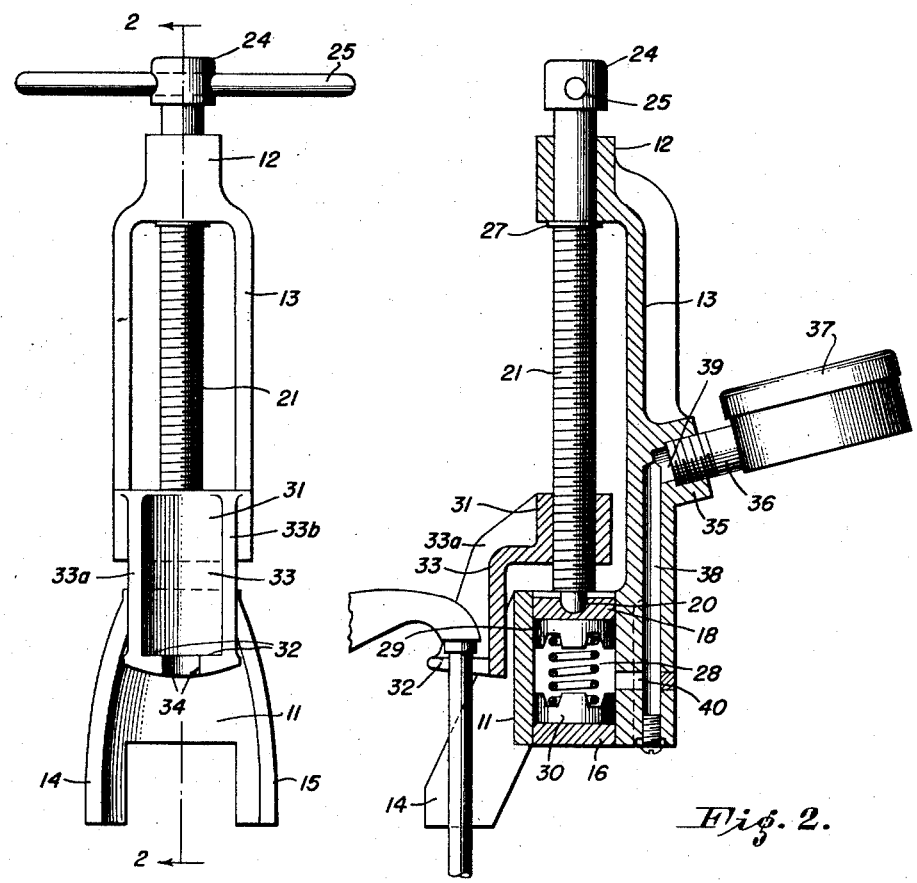
Fig.1.
Fig.2.
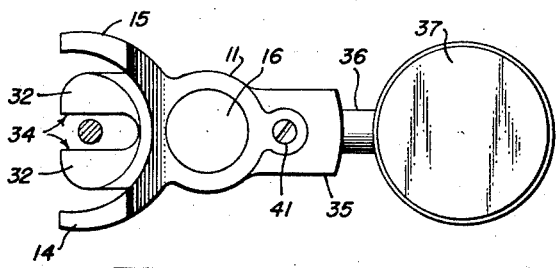
Fig.3.
INVENTOR.
JESSE THOMAS SIMMONS
BY Ralph B. Stewart
Attorney

United States Patent Office 2,910,864
Patented Nov. 3, 1959

2,910,864
HYDRAULIC VALVE-LIFTER TESTING DEVICE

Jesse Thomas Simmons, Chattanooga, Tenn.

Application December 17, 1956, Serial No. 628,640

8 Claims. (Cl. 73—119)

This invention relates to a testing device for determining the leak-down characteristics of hydraulic valve-lifters of the type commonly used on internal combustion engines.

Hydraulic valve-lifters must, of necessity, be capable of partially collapsing during the normal valve opening and closing operation so as to assure complete closing of the valves at the end of each cycle of operation. However, for proper operation and long life, as well as freedom from noise, the lifters must collapse at a predetermined rate and in response to predetermined operating pressures. A too rapid collapse of a lifter will prevent full opening of its valve, with a corresponding decrease in efficiency of the engine and, at the same time, this condition usually results in failure of the lifter to fully "pump up" before the next cycle of operation for that particular valve is repeated, thus causing excessive backlash to exist in the valve train with consequent destructive impact loading of the valve train and noisy operation. If, on the other hand, the lifter does not collapse a sufficient amount and at a sufficiently high rate, there is the danger that its valve will not properly close, causing the attendant consequences. It is, therefore, a primary object of this invention to provide a testing device by which an accurately determined testing pressure may be applied to the valve-lifter for testing its leak-down characteristics.

A further object of the invention is to provide a device for testing hydraulic valve-lifters without removing them from the engine.

Still another object is to provide a testing device embodying a lifting jack having a base to be seated on the cylinder head and having a movable part adapted to engage the lower face of a rocker arm where it engages a valve stem for applying an upward pressure on the rocker arm, the device also embodying a suitable pressure gauge for indicating the amount of pressure applied to the rocker arm and thereby applied to the valve-lifter.

It is a further object of this invention to provide a testing device of the character described which employs a piston member operating upon a body of fluid and acting as a base for a lifting jack capable of exerting a collapsing force upon a hydraulic valve-lifter so that the pressure at which leak-down occurs will be reflected in the body of operating fluid and is measurable by a suitable gauge which at the same time provides an indication of the rate of leak-down.

One form of the invention is shown in the accompanying drawing in which:

Figure 1 is front elevational view of the testing device;

Figure 2 is a vertical section taken along the plane of section line 2—2 in Figure 1 showing internal details of construction; and Figure 3 is a bottom view of the testing device.

As is shown in the drawings, the testing device has a rigid frame formed of a lower base portion, which includes a cylinder 11, an upper or head portion formed of sleeve 12, and an intermediate throat portion or bracket 13 rigidly inter-connecting the head and base and maintaining them in vertically spaced relationship as shown. The base includes a pair of legs 14 and 15 projecting downwardly and forwardly from cylinder 11, and these legs are spread apart and curved as shown so as to straddle the valve spring of a conventional overhead valve cylinder head. The vertical bore of cylinder 11 is closed at its lower end by a plug member 16 which is suitably pinned or staked in place to define within the base a chamber or recess which receives a supply or body of fluid such as hydraulic brake fluid. Operating within cylinder 11 is a piston member 18 having a hemispherical depression in the upper exposed face thereof for receiving the ball-stud end portion 20 at the lower end of a lead screw 21 extending downwardly through the bore of sleeve 12. The upper end 22 of the lead screw is formed with a smooth exterior surface of uniform circular cross-section and is slidably and rotatably guided within the bore in the head 12, which bore is in vertical alignment with the bore of cylinder 11. The upper free end of the lead screw is provided with an enlarged head portion 24 and projecting laterally therethrough is a T-bar handle 25 for turning the screw. Just above the threaded portion of the lead screw is a collar 27 which bears against the undersurface of the head or sleeve 12 and limits the vertical upward position of the lead screw. Preferably, this collar 27 is separate from the lead screw and may simply be a snap ring received within a groove in the lead screw. The purpose of the collar is to prevent accidental withdrawal of the piston 18 from the recess or cylinder.

To maintain the piston 18 in engagement with the lower ball-stud end 20 of the lead screw at all times, a compression spring 28 is arranged within cylinder 12 and presses upwardly on piston 18. Preferably, deformable piston cup members 29 and 30 are employed against both the face of the piston 18 and the inner face of the closure member 16, thus minimizing leakage of hydraulic fluid. Of course, these cups will be maintained in place by the spring 28.

A traveling nut 31 is threaded on the threaded portion of the lead screw 21 and is provided with an outwardly and downwardly extending projecting bracket 33 which carries at its lower end a horizontally extending finger or ledge portion 32. The finger portion 32 is bifurcated by the notch 34 which notch is of slightly greater width than the diameter of a valve stem so that the finger portion may straddle the upper free end of the valve stem above the valve spring retaining washer and seat directly upon the undersurface of the end of the rocker arm where it engages the end of the valve stem. The bracket 33 is provided with integral side flanges 33a and 33b which stiffen the bracket and the finger 32 at the outer edges. The throat or bracket portion 13 may be formed as a semi-cylindrical part with a stiffening rib on its rear face, as shown, and the nut 31 may extend laterally into overlapping sliding relation with the edges of the semi-cylindrical part of bracket 13, see Figure 1. This construction will also prevent turning of the nut assembly when the device is in use, as will be readily observed.

The throat portion 13 is provided on the rear side thereof with a laterally projecting nipple 35 which is internally threaded to receive the spud 36 of a fluid pressure indicating gauge 37 such that the dial of the gauge faces upwardly and may be easily read. The throat or bracket 13 is also provided with a vertical passageway 38 extending from the nipple recess 39 at its upper end and opening through the lower end of the bracket. A lateral bore 40 connects passageway 38 with the bore of cylinder 11. Both the access ends of the bores 38 and 40 may be closed by suitable means, such as the screw 41 closing the lower end of passage 38, the screw being removable for filling the cylinder and passageways with hydraulic fluid.

In operation, the device is positioned so that the legs 14 and 15 straddle the valve spring and the lower ends thereof bear upon the upper face of the cylinder head on opposite sides of the spring. The finger portion 32 extends under the operating end of the rocker arm, as explained above, on a fully closed valve. It is to be noted that the points of engagement of the feet 14 and 15 are directly in alignment below the point of contact between the lifting finger portion 32 and the rocker arm to avoid any canting forces on the frame which might cause tilting of the device. The lead screw is then turned so as to move the nut 31 upwardly to rock the rocker arm and thereby exert a collapsing force on the hydraulic valve-lifter through the rocker arm and associated push rod. Since the pressure on the rocker arm will also be exerted on piston 18 through the lower end of screw 21, the piston will be depressed and thereby develop a corresponding pressure in the hydraulic fluid, which pressure may be read directly upon the gauge 37. By observing the gauge, the pressure at which leak-down begins to occur can be readily observed and the rate of leak-down can also be observed by noting the amount of drop in the indicated pressure within a given time.

In the practical use of the device, the screw 21 is set so that the pressure on gauge 37 is a certain value, such as 200 pounds, and the gauge is observed without changing screw 21. A condition of no fall-off in pressure, or small fall-off, indicates a stuck valve-lifter plunger. Very fast fall-off in pressure indicates a worn out valve-lifter. Either condition indicates need for valve-lifter replacement.

The dial of the pressure gauge 37 can be calibrated in terms of fluid operating pressure within the hydraulic valve-lifter, and since the leak-down pressures and rates are held within certain tolerances by the manufacturers of the lifters, it can be readily determined whether a particular lifter is within the specified tolerances. It is also to be noted that this device may be used without removing the valve-lifter or dismantling the engine, except only the removal of the valve cover.

I claim:

1. A device for testing the leak-down characteristics of hydraulic valve-lifters mounted in internal combustion engines comprising a lifting jack having a base adapted to be seated on the cylinder head of said engine adjacent a valve stem passing through said head, said jack having a movable part including a finger portion for engaging the lower face of a rocker-arm on each side of said valve stem, a vertical guide part mounted on said base for guiding said movable part, a cylinder carried by said base and having a piston mounted for movement therein, said cylinder being filled with fluid, lifting means for moving said movable part upwardly on said guide part to apply a lifting force to said rocker-arm, said lifting means acting upon said piston and subjecting the fluid in said cylinder to pressure, and a liquid pressure gauge connected to said cylinder to indicate pressure fluctuation of said fluid by pressure exerted thereon by said piston to determine the leak-down characteristics of a valve-lifter connected to said rocker-arm.

2. A device for testing the leak-down characteristics of hydraulic valve-lifters comprising, a rigid frame having a base portion for seating upon an internal combustion engine cylinder-head and having a cylindrical recess therein, a piston operable within said recess, a fluid filling said recess below said piston, a lead-screw journaled in said frame and having one end bearing upon said piston, a traveling nut threaded upon said lead-screw and including a finger portion engageable under the valve-stem end of a rocker-arm mounted on said cylinder-head, means for turning said lead-screw to exert a lifting force on the associated rocker-arm, and a liquid pressure gauge connected to indicate pressure fluctuation of said fluid contained within said recess as occasioned by pressure exerted thereon by said piston to determine the leak-down characteristics of a valve-lifter connected to said rocker-arm.

3. In a tool as defined in and by claim 2 wherein said finger portion is bifurcated to straddle the free end of a valve stem and seat directly under the valve-stem end of the rocker-arm.

4. A device for testing the leak-down characteristics of hydraulic valve-lifters comprising, a rigid frame having a base portion and a head portion rigidly mounted thereon by an intermediate throat portion, said base portion having a recess therein and said head portion having a bore therethrough in axial alignment with said recess, a piston received in said recess, a fluid filling the space in said recess enclosed by said piston, a lead-screw journaled in the bore of said head and having its remote end bearing upon said piston, a traveling nut threaded on said lead-screw and including a projecting finger portion for engaging the under side of the valve-stem end of a rocker-arm, and a pressure gauge for indicating pressure fluctuations of the fluid contained within said recess to determine the leak-down characteristics of an hydraulic valve-lifter connected with said rocker-arm.

5. A device according to claim 4 wherein said finger portion is bifurcated to straddle the free end of a valve stem and seat directly under the valve-stem end of said rocker-arm.

6. A device for testing the leak-down characteristics of hydraulic valve-lifters comprising, a rigid frame having a base, a head spaced above said base and an intermediate throat rigidly connecting the base and throat, said base and head having axially aligned bores therethrough, a closure member closing the lower end of said base bore to define a liquid-receiving recess, a piston in the upper end of said recess, a lead-screw having one end slidably and rotatably guided in said head bore and having its opposite end bearing upon said piston, a traveling nut threaded on said lead-screw and including a projecting finger portion for engaging under the valve-stem end of a rocker-arm when said base is seated on a cylinder head carrying said rocker-arm, means for turning said lead-screw to move said nut and exert a lifting force on the rocker-arm with respect to said cylinder head, and a pressure gauge for indicating pressure fluctuations of a body of fluid contained within said recess as occasioned by pressure exerted thereon by said piston.

7. A device according to claim 6 wherein said base is provided with downwardly projecting arcuated feet for straddling an engine valve-spring and seating upon the engine cylinder-head in line with the contact between the finger portion and the rocker-arm.

8. A device according to claim 6 wherein said throat is provided with a nipple for receiving said gauge so that its dial is facing upwardly, and there being a passageway in said throat parallel with said recess and interconnecting the recess and the nipple.

References Cited in the file of this patent
UNITED STATES PATENTS

| | | |
|---|---|---|
| 1,098,102 | Elmes | May 26, 1914 |
| 1,354,447 | Troll | Sept. 28, 1920 |
| 1,822,587 | Essen | Sept. 8, 1931 |
| 2,066,585 | Sunnen | Jan. 5, 1937 |
| 2,616,292 | Malm | Nov. 4, 1952 |
| 2,619,834 | Kelly | Dec. 2, 1952 |
| 2,635,464 | Burrell | Apr. 21, 1953 |